(12) United States Patent
Iwamoto et al.

(10) Patent No.: US 11,821,813 B2
(45) Date of Patent: Nov. 21, 2023

(54) DRIVE TRAIN ABNORMALITY DETERMINATION DEVICE FOR STRADDLED VEHICLE, AND STRADDLED VEHICLE

(71) Applicant: YAMAHA HATSUDOKI KABUSHIKI KAISHA, Iwata (JP)

(72) Inventors: Kazuteru Iwamoto, Shizuoka (JP); Hisatoshi Kinoshita, Shizuoka (JP); Nobuyuki Kawashima, Shizuoka (JP)

(73) Assignee: YAMAHA HATSUDOKI KABUSHIKI KAISHA, Iwata (JP)

( * ) Notice: Subject to any disclaimer, the term of this patent is extended or adjusted under 35 U.S.C. 154(b) by 19 days.

(21) Appl. No.: 17/472,507

(22) Filed: Sep. 10, 2021

(65) Prior Publication Data

US 2022/0050019 A1    Feb. 17, 2022

Related U.S. Application Data

(63) Continuation-in-part of application No. PCT/JP2020/006041, filed on Feb. 17, 2020.

(30) Foreign Application Priority Data

Mar. 13, 2019  (JP) ................. 2019-045537

(51) Int. Cl.
*G01M 15/11*  (2006.01)
*F02D 41/14*  (2006.01)
*B62K 11/00*  (2006.01)

(52) U.S. Cl.
CPC ......... *G01M 15/11* (2013.01); *F02D 41/1498* (2013.01); *B62K 11/00* (2013.01); *F02D 2200/1015* (2013.01); *F02D 2200/702* (2013.01)

(58) Field of Classification Search
CPC ................ G01M 15/11; F02D 41/1498; F02D 41/0097; F02D 41/22; F02D 2200/1015; F02D 2200/702; B62K 11/00
See application file for complete search history.

(56) References Cited

U.S. PATENT DOCUMENTS 5,381,688 A  *  1/1995  Ikeda ....................... G01B 5/28
                                                  73/105
2008/0011069 A1*  1/2008  Assaf ..................... G01M 15/11
                                                  73/114.12

(Continued)

FOREIGN PATENT DOCUMENTS

EP      3450735 A1      3/2019
JP    H05312085 A      11/1993
(Continued)

*Primary Examiner* — George C Jin
(74) *Attorney, Agent, or Firm* — Rabin & Berdo, P.C.

(57) ABSTRACT

A drive train abnormality determination device for a straddled vehicle that includes a drive train having a rotator. The drive train abnormality determination device includes an angle signal output unit that periodically outputs an angle signal in accordance with rotation of the rotator, a rotator rotation speed fluctuation physical quantity acquisition unit that acquires a quantity related to a fluctuation in a rotation speed of the rotator, based on the angle signal from the angle signal output unit, a rough road determination unit that determines whether a distribution state or pattern satisfies a predetermined rough road condition, a continuity determination unit that determines whether the rough road condition is continuously satisfied, and a drive train abnormality determination unit that determines, responsive to a determination by the continuity determination unit that the rough road condition is continuously satisfied, that the drive train has an abnormality in its functioning.

5 Claims, 8 Drawing Sheets

(56) References Cited

U.S. PATENT DOCUMENTS

| | | | |
|---|---|---|---|
| 2008/0249811 A1* | 10/2008 | Qiao | G01M 15/042 |
| | | | 702/33 |
| 2009/0120175 A1* | 5/2009 | Assaf | G01M 15/11 |
| | | | 73/114.02 |
| 2009/0132120 A1* | 5/2009 | Walters | G01M 15/11 |
| | | | 701/37 |
| 2016/0299035 A1* | 10/2016 | Choi | G01M 15/11 |
| 2018/0087462 A1* | 3/2018 | Hotta | F02D 41/1497 |
| 2019/0101472 A1 | 4/2019 | Wakimura et al. | |

FOREIGN PATENT DOCUMENTS

| | | |
|---|---|---|
| JP | 2008037255 A | 2/2008 |
| WO | 2017208757 A1 | 12/2017 |

* cited by examiner

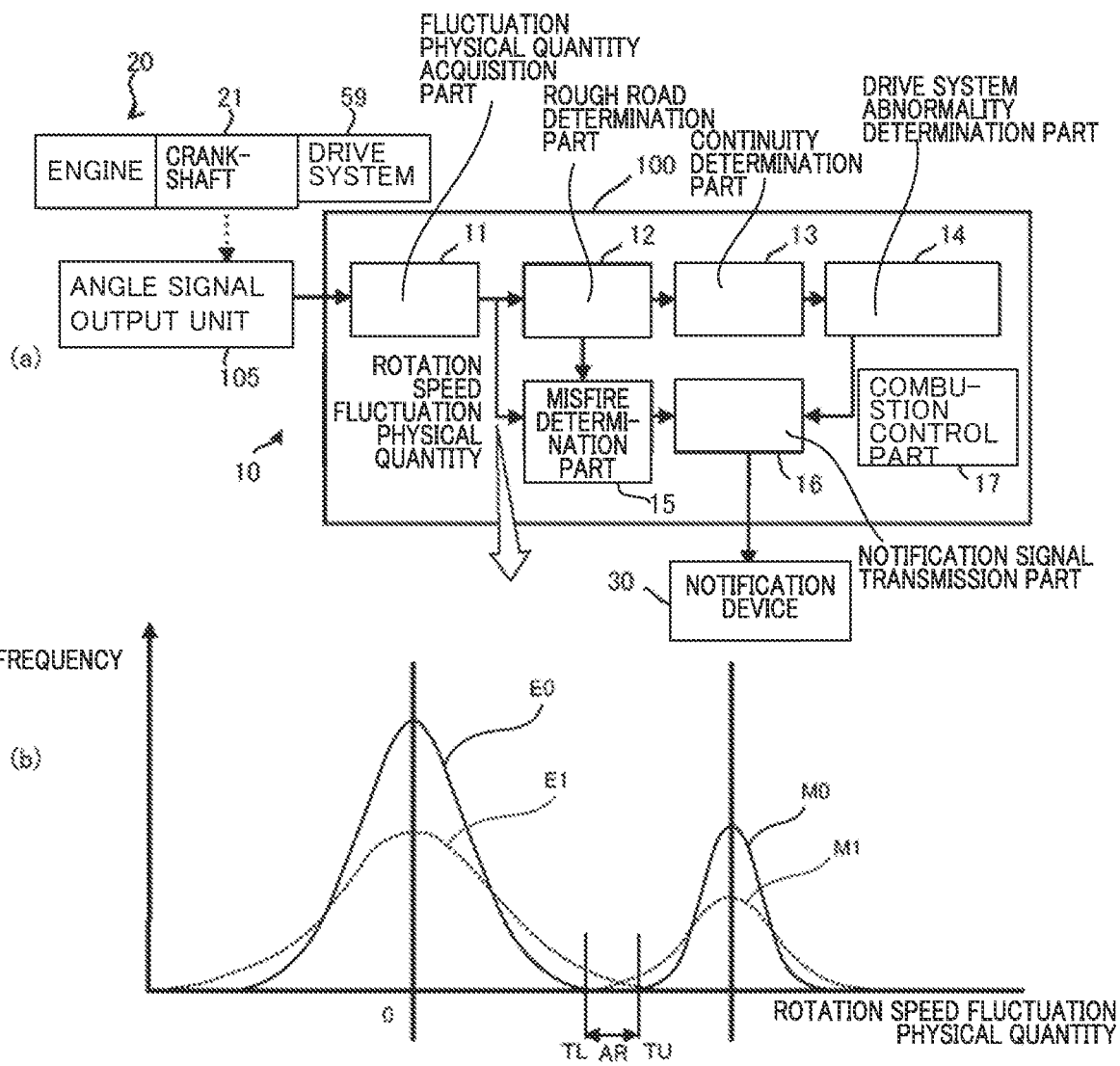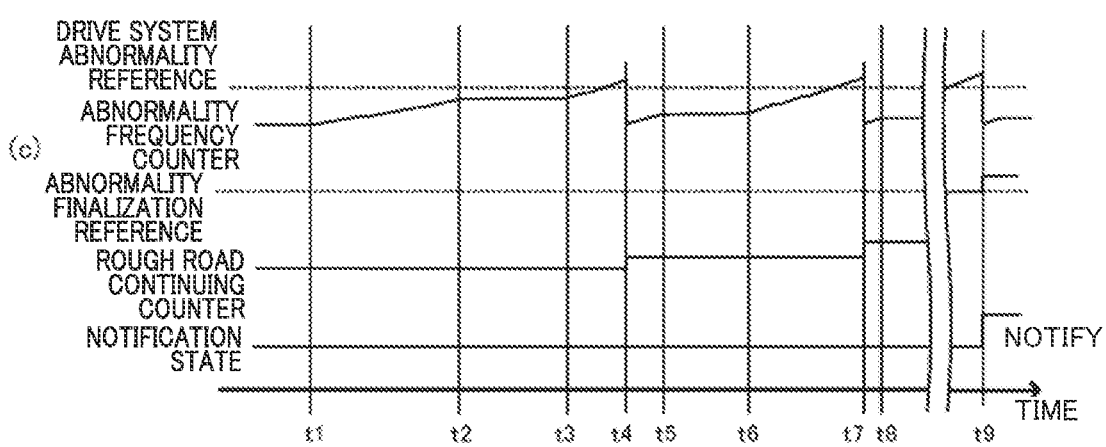

DRIVE TRAIN ABNORMALITY DETERMINATION DEVICE FOR STRADDLED VEHICLE, AND STRADDLED VEHICLE

CROSS-REFERENCE TO RELATED APPLICATIONS

This is a continuation-in-part application of International Application PCT/JP2020/006041 filed on Feb. 17, 2020, which claims priority from a Japanese Patent Application No. 2019-045537, filed on Mar. 13, 2019. The contents of the applications are incorporated herein by reference.

TECHNICAL FIELD

The present teaching relates to a drive train abnormality determination device for a straddled vehicle, and to a straddled vehicle.

Background Art

For example, Patent Literature 1 (PTL 1) shows a device that detects an abnormality of an element included in a wrapping transmission element provided in a straddled vehicle. The wrapping transmission element is a member that transmits a driving force from an engine. The device of PTL 1 detects a periodic fluctuation based on the rotation speed of a rotator rotated by the engine. The periodic fluctuation is included in an engine rotation fluctuation, and is repeated on a cycle of circulation of the element. The device of PTL 1 computes a fluctuation index indicating an abnormality of the wrapping transmission element by, for example, applying an autocorrelation function to the fluctuating rotation speed. If, for example, the rotation fluctuation index based on the autocorrelation function is high, it is determined that the wrapping transmission element is functioning abnormally.

CITATION LIST

Patent Literature

PTL 1: Pamphlet of WO2017/208757

SUMMARY OF INVENTION

Technical Problem

For example, in computation that applies the autocorrelation function, regarding rotation speeds that are acquired as time elapses, it is required that a computing process be performed on a second rotation speed relative to a first rotation speed, the first rotation speed being acquired a certain period before the second rotation speed. With the autocorrelation function, computation is performed on a plurality of data groups of rotation speeds corresponding to an assumed plurality of periods. The computing process is complicated, therefore the computation may take a long time. This problem is not peculiar to a wrapping transmission element, but is common in cases where an abnormality of a drive train mounted to a straddled vehicle is determined by using for example, an autocorrelation function.

The present teaching aims to provide a drive train abnormality determination device and a straddled vehicle, the drive train abnormality determination device being capable of determining an abnormality of a drive train provided in the straddled vehicle with a simple configuration.

Solution to Problem

The inventors of the present application conducted studies, aiming to determine an abnormality with a simple configuration. The inventors consequently discovered the following.

Known as a straddled vehicle is, for example, a straddled vehicle equipped with an engine and a device that detects that the vehicle is traveling on rough road. In some cases, an engine rotation fluctuation can be used to detect a rough road traveling state of the vehicle.

In this respect, however, determination of traveling on rough road based on the engine rotation fluctuation may sometimes allow a state other than traveling on rough road to be detected as a vehicle traveling on a rough road. The inventors of the present application further conducted detailed studies on determination of traveling on rough road based on the engine rotation fluctuation. Consequently, it was discovered that if traveling on rough road is determined based on the engine rotation fluctuation, the determination results actually contain an erroneous determination attributable to an abnormal functioning of a drive train.

A rotation speed fluctuation is influenced by the abnormal functioning of the drive train, too. Thus, in a case of determining whether or not a distribution state or pattern, of physical quantities based on a fluctuation in the rotation speed of a rotator satisfies for example, a predetermined rough road condition, results of the determinations may contain an erroneous determination attributable to an abnormal functioning of the drive train. This, in turn, means that it is also possible to determine the abnormal functioning of the drive train by determining whether or not the distribution state or pattern satisfies the predetermined rough road condition based on acquired physical quantities.

The rough road condition is established when the straddled vehicle is traveling on rough road. That is, a determination that the rough road condition is established results from traveling on rough road, which is a temporary phenomenon. If a road on which the straddled vehicle is traveling changes from a rough road to a flat road for example, the rough road condition is dissipated.

The abnormal functioning of the drive train, on the other hand, is normally an irreversible phenomenon caused by deterioration of the drive train. The abnormal functioning of the drive train is not dissipated until a component part is replaced or repaired, for example.

Thus, if the distribution state or pattern, based on physical quantities is determined as satisfying the predetermined rough road condition, then it is possible to determine whether or not the rough road condition is established continuously. Determining whether or not the rough road condition is continuously established makes it possible to further determine whether the establishment of the rough road condition is actually due to traveling on rough road or if it's due to an abnormal functioning of the drive train. In other words, a determination of an abnormal functioning of the drive train is allowed by performing the determination of whether or not the rough road condition is continuously established in addition to the determination of traveling on rough road that uses physical quantities based on a rotation speed fluctuation. Both the determination of whether or not the rough road condition is established and the determination of whether or not the rough road condition is continued can be implemented with a simple configuration as compared to, for example, a process such as computation of an autocorrelation function.

To attain the aim, an aspect of the present teaching provides a drive train abnormality determination device for a straddled vehicle, the drive train abnormality determination device having the following configurations.

(1) A drive train abnormality determination device for a straddled vehicle is mounted to a straddled vehicle, and includes:
- an angle signal output unit that periodically outputs an angle signal in accordance with rotation of a rotator included in a drive train of the straddled vehicle;
- a rotator rotation speed fluctuation physical quantity acquisition unit that acquires a rotator rotation speed fluctuation physical quantity related to a fluctuation in the rotation speed of the rotator, based on a signal from the angle signal output unit;
- a rough road determination unit that determines whether or not a distribution state or pattern based on the rotator rotation speed fluctuation physical quantity acquired by the rotator rotation speed fluctuation physical quantity acquisition unit satisfies a predetermined rough road condition;
- a continuity determination unit that determines whether or not a state is continuing where the rough road condition is satisfied; and
- a drive train abnormality determination unit that determines that if the continuity determination unit determines that the state is continuing where the rough road condition is satisfied, then the drive train has an abnormality in its functioning.

In the above-described configuration, the drive train abnormality determination device for a straddled vehicle is mounted to the straddled vehicle. The drive train abnormality determination device for a straddled vehicle includes the angle signal output unit, the rotator rotation speed fluctuation physical quantity acquisition unit, the rough road determination unit, the continuity determination unit, and the drive train abnormality determination unit.

The angle signal output unit periodically outputs an angle signal in accordance with rotation of the rotator included in the drive train of the straddled vehicle. The rotator rotation speed fluctuation physical quantity acquisition unit acquires a rotator rotation speed fluctuation physical quantity related to a fluctuation in the rotation speed of the rotator, based on a signal from the angle signal output unit. The rough road determination unit determines whether or not a distribution state or pattern based on the acquired rotator rotation speed fluctuation physical quantity satisfies the predetermined rough road condition. The continuity determination unit determines whether or not the state is continuing where the rough road condition is satisfied. The continuity determination unit may alternatively determine whether or not a result of the determination by the rough road determination unit indicating satisfaction of the rough road condition is continuing. If the continuity determination unit determines that the state is continuing where the rough road condition is satisfied, the drive train abnormality determination unit determines that the drive train has an abnormality in its functioning.

An abnormality of the drive train is manifested as a fluctuation in the rotation speed of the rotator. This is why a result of determining whether or not a distribution state or pattern, based on the acquired rotator rotation speed fluctuation physical quantity satisfies the predetermined rough road condition can include abnormal functioning of the drive train. In other words, it is possible to determine the presence of abnormal functioning of the drive train, by determining whether or not a distribution state or pattern, based on the acquired rotator rotation speed fluctuation physical quantity satisfies the predetermined rough road condition.

Here, the rough road condition is established during a period in which the straddled vehicle is traveling on rough road. Thus, the determination result indicating satisfaction of the rough road condition comes from traveling on rough road, which is a temporary phenomenon. An abnormality of the drive train, on the other hand, is an unrecoverable phenomenon.

Accordingly, when a distribution state or pattern based on the rotator rotation speed fluctuation physical quantity is determined as satisfying the predetermined rough road condition, then it is possible to determine whether or not establishment of the rough road condition is continuing. Determining whether or not establishment of the rough road condition is continuing makes it possible to further determine whether the establishment of the rough road condition is actually due to traveling on rough road or is due to an abnormality of the drive train. In other words, a determination of an abnormality of the drive train is allowed by performing the determination of whether or not the establishment of the rough road condition is continuing in addition to the rough road traveling determination that uses a fluctuation in the rotation speed of the rotator. Both the determination of whether or not the rough road condition is satisfied and the determination of whether or not the rough road condition is continued can be implemented with a simple configuration as compared to, for example, a process such as computation of an autocorrelation function.

Accordingly, an abnormality of the drive train provided in the straddled vehicle can be determined with a simple configuration.

In an aspect of the present teaching, the drive train abnormality determination device for a straddled vehicle can adopt the following configuration.

(2) The drive train abnormality determination device for a straddled vehicle according to (1) is configured such that
- the continuity determination unit determines whether or not the state is continuing where the rough road condition is satisfied under the circumstance where the straddled vehicle is traveling at a higher speed than an upper limit set speed, the upper limit set speed being set as an upper limit speed at which the straddled vehicle is able to travel on rough road.

A rough road normally does not have a road surface condition suitable for a straddled vehicle traveling at a high speed. The higher the traveling speed of the straddled vehicle is, the more the drive train is influential to a distribution state of rotator rotation speed fluctuation physical quantities. Since whether or not the fulfillment of the rough road condition is continuing is determined during traveling at a speed higher than the upper limit set speed at which traveling on rough road is possible, an abnormality of the drive train can be determined more precisely.

In an aspect of the present teaching, the drive train abnormality determination device for a straddled vehicle can adopt the following configuration.

(3) The drive train abnormality determination device for a straddled vehicle according to (1) further includes a misfire determination unit that determines whether or not a distribution state or pattern based on the rotator rotation speed fluctuation physical quantity acquired by the rotator rotation speed fluctuation physical quantity acquisition unit satisfies a predetermined misfire condition, and
- if the drive train abnormality determination unit determines that the drive train has an abnormality in its functioning, the misfire determination unit changes the predetermined misfire condition.

If the rotator rotation speed fluctuation physical quantity contains an influence of an abnormality of the drive train, the misfire determination unit may make an erroneous determination. For example, even though a misfire actually occurs, a distribution state or pattern based on the rotator rotation speed fluctuation physical quantity may be determined as not satisfying the predetermined misfire condition. In the above-described configuration, the predetermined misfire condition is changed in accordance with an abnormality of the drive train. Accordingly, the robustness of the determination of whether or not the misfire condition is satisfied against the abnormality of the drive train can be improved with a simple configuration.

In an aspect of the present teaching, the drive train abnormality determination device for a straddled vehicle can adopt the following configuration.

(4) The drive train abnormality determination device for a straddled vehicle according to (3) further includes a notification signal transmitter that transmits a notification signal to a notification device if the drive train abnormality determination unit determines that the drive train has an abnormality in its functioning, the notification signal making the notification device provide the notification, the notification device being configured to provide the notification that the drive train does have an abnormality in its functioning.

The above-described configuration, which notifies that the drive train has an abnormality, can facilitate replacement or repair of a component part of the drive train. Accordingly, a long-term robustness of the determination of whether or not the misfire condition is satisfied can be improved with a simple configuration.

(5) A straddled vehicle includes:
the drive train abnormality determination device for a straddled vehicle according to (1) to (4); and
a drive train serving as an object in which an abnormality in its functioning is to be determined by the drive train abnormality determination device for a straddled vehicle.

With the above-described configuration, an abnormality of the drive train can be determined with a simple configuration.

The terminology used herein is for defining particular embodiments only and is not intended to be limiting the teaching.

As used herein, the term "and/or" includes any and all combinations of one or more of the associated listed items.

As used herein, the terms "including", "comprising", or "having", and variations thereof specify the presence of stated features, steps, elements, components, and/or equivalents thereof, and can include one or more of steps, operations, elements, components, and/or their groups.

As used herein, the terms "attached", "connected", "coupled", and/or equivalents thereof are used in a broad sense, and include both of direct and indirect attachment and coupling unless otherwise specified. The terms "connected" and "coupled" are not limited to physical or mechanical connection or coupling, and can include direct and indirect electrical connection and coupling.

Unless otherwise defined, all terms (including technical and scientific terms) used herein have the same meaning as commonly understood by one of ordinary skill in the art to which the present teaching belongs.

It will be further understood that terms, such as those defined in commonly used dictionaries, should be interpreted as having a meaning that is consistent with their meaning in the context of the present teaching and relevant art and should not be interpreted in an idealized or overly formal sense unless expressly so defined herein.

It will be understood that the description of the present teaching discloses multiple techniques and steps.

Each of these has individual benefit and each can also be used in conjunction with one or more, or in some cases all, of the other disclosed techniques.

Accordingly, for the sake of clarity, this description will refrain from repeating every possible combination of the individual steps in an unnecessary fashion.

Nevertheless, Description and Claims should be read with the understanding that such combinations are entirely within the scope of the present teaching and the claims.

Description will give an explanation about a novel vehicle.

In the description given below, for the purposes of explanation, numerous specific details are set forth in order to provide a thorough understanding of the present teaching.

It will be apparent, however, that those skilled in the art may practice the present teaching without these specific details.

The present disclosure is to be considered as an exemplification of the present teaching, and is not intended to limit the present teaching to the specific embodiments illustrated by drawings or descriptions below.

The drive train abnormality determination device for a straddled vehicle may be, for example, either an engine control unit (ECU) like the later-described one or a drive train abnormality determination device provided in the vehicle separately from the ECU. The drive train abnormality determination device for a straddled vehicle is, for example, capable of communication at least with an internal combustion engine. The drive train abnormality determination device for a straddled vehicle is configured to be capable of receiving a signal outputted from a sensor, etc. included in the internal combustion engine and transmitting a control signal to various apparatuses and/or devices, etc. included in the internal combustion engine, for example. The drive train abnormality determination device for a straddled vehicle may further be configured to be capable of receiving a signal outputted from a sensor, etc. included in the straddled vehicle and transmitting a control signal to various apparatuses and/or devices, etc. included in the straddled vehicle, for example.

The rotator rotation speed fluctuation physical quantity acquisition unit, the rough road determination unit, the continuity determination unit, and the drive train abnormality determination unit are implemented by a computer 100 executing programs, for example. In this respect, however, the rotator rotation speed fluctuation physical quantity acquisition unit, the rough road determination unit, the continuity determination unit, and the drive train abnormality determination unit are not limited to the above, and for example, may be configured as a hardware logic on an integrated circuit. Furthermore, an integrated circuit constituting a part of the above-mentioned blocks may be provided independently of other integrated circuits.

The straddled vehicle refers to a vehicle of a type having a saddle where a rider sits astride. Examples of the straddled vehicle include a motorcycle, a three-wheeled motorcycle, and an all-terrain vehicle (ATV).

The rotator is a crankshaft, for example. The rotator is not limited to this, and may be a transmission gear, a sprocket wrapped with a chain, or a wheel.

The engine is a three-cylinder engine. As the engine, a single cylinder engine or a two-cylinder engine can be adopted, and an engine with four or more cylinders can be adopted, too.

The drive train drives the straddled vehicle. The drive train includes a clutch, a transmission device, and a driving force transmit device, for example. The driving force transmit device is, for instance, a chain, a sprocket, a belt, a pulley, or a combination of them. The drive train includes a wheel, for example. The drive train is not limited to this, and may not always need to include a wheel. In such a configuration, the drive train drives the wheel.

The angle signal output unit is not particularly limited, and a conventionally known apparatus can be adopted as the angle signal output unit. Examples of the crank angle signal output unit include a resolver, a Hall IC, an electromagnetic induction type sensor, and the like.

The rotation speed fluctuation physical quantity represents a fluctuation in the rotation speed. The rotation speed fluctuation physical quantity may be acquired based on an average rotation speed over a period equal to or shorter than a combustion cycle, for example. The rotation speed fluctuation physical quantity may be acquired based on a rotation speed at a certain rotation angle, for example. The rotation speed fluctuation physical quantity is a quantity representing a jerk, for example. The rotation speed fluctuation physical quantity may alternatively be a quantity representing an acceleration, for example. The rotation speed fluctuation physical quantity may alternatively be a quantity representing a rotation speed, for example. In such a case, a rotation speed fluctuation is indicated by plural rotation speeds.

Examples of the physical quantity include the speed, the acceleration, the jerk, and the time, which is the reciprocal of the speed, acceleration, or jerk. The physical quantity may be any of the amplitude, the frequency, and the phase, for example.

The rough road determination unit determines whether or not a distribution state based on rotator rotation speed fluctuation physical quantities satisfies the predetermined rough road condition. The rough road determination unit may determine whether or not a pattern based on rotator rotation speed fluctuation physical quantities satisfies the predetermined rough road condition. The pattern is the shape of a fluctuation in the physical quantity during a certain period.

The rough road condition is a condition that the distribution state based on rotator rotation speed fluctuation physical quantities fulfills in a rough road traveling state, for example. The rough road condition is determined based on, for example, how frequently a rotator rotation speed fluctuation physical quantity is included in a rough road determination region in a rotator rotation speed fluctuation physical quantity distribution. The rough road determination region is a region disposed in the rotator rotation speed fluctuation physical quantity distribution, the region being set between a distribution obtained in a misfire situation with flat road traveling and a distribution obtained in a normal situation (non-misfire situation) with flat road traveling. The rough road determination unit determines that a distribution state based on rotator rotation speed fluctuation physical quantities satisfy the rough road condition, not only in the rough road traveling state but also in a case of the drive train having an abnormality, for example.

The determination of the rough road condition by the rough road determination unit or the like is not limited to this, and for example, may include the following determinations:

(a) determining a rough road by using a variation pattern of a fluctuation physical quantity, as shown in Japanese Patent Application Laid-Open No. H5-10199 (1993);

(b) determining a rough road by using a result of filtering a specific period pattern of a fluctuation physical quantity with a filter having characteristics adapted to a misfire frequency and a filter having characteristics different from those adapted to the misfire frequency, as shown in Japanese Patent Application Laid-Open No. 2004-124795; and (c) determining a rough road based on a result of acquiring a standard deviation of a fluctuation physical quantity and comparing it against a normal distribution, as shown in Japanese Patent Application Laid-Open No. H5-296101 (1993).

As for whether or not a state where the rough road condition is satisfied is established, the continuity determination unit can use a result of a determination made by the rough road determination unit. That is, the continuity determination unit may be configured to determine whether or not a result of the determination by the rough road determination unit indicating satisfaction of the rough road condition is continuing. Alternatively, the continuity determination unit may be configured to perform a determination process for determining whether or not a state is continuing where the rough road condition is satisfied, separately from a determination process performed by the rough road determination unit.

A period (continuity determination period) for which the continuity determination unit determines whether or not establishment of the rough road condition is continuing is longer than a period (rough road condition determination period) for which the rough road determination unit determines whether or not the rough road condition is satisfied. In the rough road condition determination period, whether or not a distribution state or pattern based on the rotator rotation speed fluctuation physical quantity satisfies the rough road condition is determined. At this time, continuity of the distribution or pattern may be evaluated in a manner such that, for example, the presence of traveling on rough road is determined if the distribution state or pattern has been satisfied for a predetermined period or a predetermined number of times. In this case, the continuity of the distribution or pattern is evaluated in order to determine whether or not the rough road condition is established in the rough road condition determination period, and therefore this evaluation is different from the determination of continuity in the continuity determination period.

For example, with respect to every rough road condition determination period for which whether or not the rough road condition is satisfied is to be determined, the rough road determination unit determines whether or not a distribution state or pattern based on the rotator rotation speed fluctuation physical quantity satisfies the predetermined rough road condition. If the result of the determination by the rough road determination unit indicating satisfaction of the rough road condition is continuing over two or more rough road condition determination periods, the continuity determination unit determines that the drive train has an abnormality in its functioning. The continuity determination unit is not limited to this, and the unit based on which continuity of satisfaction of the rough road condition is determined may be different from the rough road condition determination period. Adoption of the rough road condition determination period can make a configuration for the determination simpler.

Set as the continuity determination period is, for example, a maximum travel period during which the straddled vehicle is assumed to travel a whole day. Thus, for example, if the state where the rough road condition is satisfied while the straddled vehicle is traveling continues over a period longer than the maximum travel period during which the straddled vehicle is assumed to travel a whole day, the continuity determination unit determines that the state is continuing where the rough road condition is satisfied. A period assumed to be the maximum travel period in a whole day is about 500 km, for example. Here, it is possible that a period still longer than the assumed maximum travel period in a whole day may be set as the period based on which the continuity determination unit performs the determination. In such a case, the determination that the state where the rough road condition is satisfied is continuing is made under a more restricted condition. For example, it is also possible that the continuity determination unit determines that the state is continuing where the rough road condition is satisfied, if the state where the rough road condition is satisfied while the straddled vehicle is traveling continues over a period longer than a period required to travel across a continent. A period that is assumed to be required for the straddled vehicle to travel across a continent without a flat road is about 5000 km, for example. The continuation period is counted as the total number of rotations of the engine, for example. The continuation period may be counted as a total travel time, for example. The continuation period may be counted as a travel distance of the straddled vehicle, for example.

A situation where establishment of the rough road condition is continuing means a situation where non-establishment of the rough road condition substantially continues to be undetected during traveling.

In the continuity determination period, if establishment of the rough road condition is continuing or substantially continuing, it is determined that the rough road condition is continuing. A situation where establishment of the rough road condition is substantially continuing means that the presence of a period in which the rough road condition is instantaneously or temporarily not satisfied is allowed. To be specific, even when a change of a travel environment or the like influences the rotator rotation speed fluctuation physical quantity so that the rough road condition is instantaneously or temporarily not satisfied, it is possible to determine that establishment of the rough road condition is continuing, if establishment of the rough road condition is continuing over the rest of the continuity determination period.

The notification signal transmitter, for example, transmits a notification signal every time it is determined that the drive train has an abnormality in its functioning. The notification signal transmitter is not limited to this, and for example, may store a determination result if it is determined that the drive train has an abnormality, and transmit a notification signal if the stored determination result satisfies a predetermined condition. For example, the notification device may be a diagnosis device that is communicably connected to the drive train abnormality determination device at an optional timing. In this configuration, the notification signal transmission part may output a signal upon connection of the notification device to the drive train abnormality determination device.

The notification device is a lamp, for example. The notification device may alternatively be an image display device or a sound generation device. The notification device may be configured to display an abnormality of the drive train, display a misfire, and display traveling on rough road. The notification device may be a diagnosis device that is connected to the drive train abnormality determination device at a time of inspection and/or repair of the straddled vehicle, for example. In this case, the notification device may not need to be constantly connected to the drive train abnormality determination device. For example, when the straddled vehicle is driven, the notification signal transmission part stores information in a memory, the information indicating a result of the determination by the misfire determination part. Upon connection of the diagnosis device serving as the notification device to the drive train abnormality determination device, the notification signal transmission part outputs the information stored in the memory. As a result, the diagnosis device serving as the notification device displays the result of the determination by the misfire determination part. The notification device may display a history of determination results, for example.

The upper limit set speed is the upper limit of a speed assumed when a rider travels on rough road in a normal manner. In this respect, however, different speeds may be set as the upper limit set speed, depending on a type of the straddled vehicle.

Advantageous Effects of Invention

The present teaching can provide a drive train abnormality determination device and a straddled vehicle, the drive train abnormality determination device being capable of determining an abnormality of a drive train provided in the straddled vehicle with a simple configuration.

BRIEF DESCRIPTION OF DRAWINGS

FIG. 1 A diagram outlining a drive train abnormality determination device according to a first embodiment of the present teaching FIG. 2 A view showing an external appearance of a straddled vehicle equipped with the drive train abnormality determination device shown in FIG. 1

DESCRIPTION OF EMBODIMENTS

Figure 2:
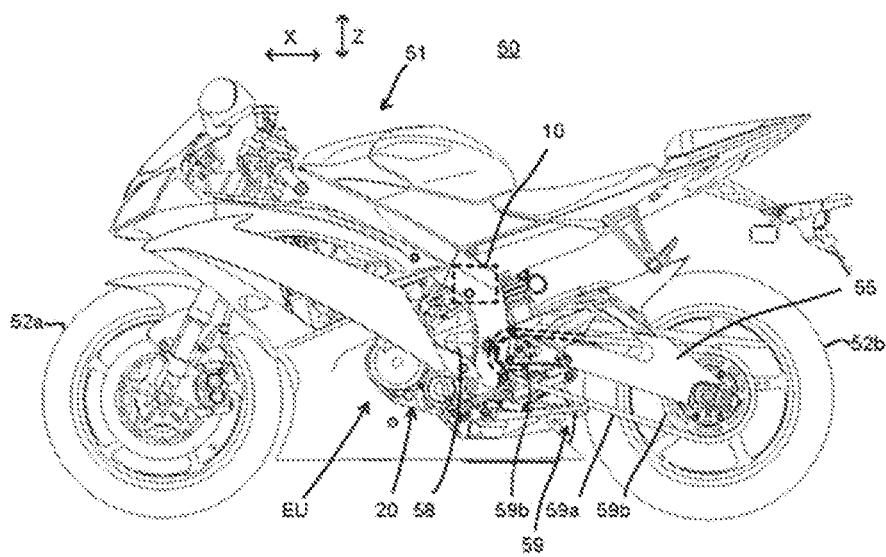

In the following, an embodiment of the present teaching will be described with reference to the drawings.

FIG. 1 is a diagram outlining a drive train abnormality determination device according to a first embodiment of the present teaching. The part (a) of FIG. 1 is a block diagram showing a drive train abnormality determination device. The part (a) of FIG. 1 also shows peripheral devices of the drive train abnormality determination device. The part (b) of FIG.

1 is a chart showing a rotation speed fluctuation physical quantity distribution, which is used for determining an abnormality of the drive train. The part (c) of FIG. 1 is a time chart illustrating an overview of operations.

A drive train abnormality determination device 10 for a straddled vehicle (hereinafter, simply referred to as the drive train abnormality determination device 10 occasionally) is mounted to a straddled vehicle 50 (see FIG. 2), for example.

The straddled vehicle 50 includes an engine 20 and a drive train 59. The drive train abnormality determination device 10 determines an abnormality of the drive train included in the straddled vehicle 50. The drive train 59 drives the straddled vehicle 50 by transmitting power of the engine 20. The engine 20 has a crankshaft 21. Power of the engine 20 is outputted via the crankshaft 21. The crankshaft 21 is a component part of the engine 20. The crankshaft 21 functions as a part of the drive train 59 that transmits power. The crankshaft 21 is an example of a rotator.

The drive train abnormality determination device 10 functions as a misfire detection device that detects a misfire in the engine 20. Herein, the drive train abnormality determination device 10 is referred to as the misfire detection device, too. The drive train abnormality determination device 10 also functions as a rough road detection device that detects whether or not the straddled vehicle 50 is traveling a rough road. The drive train abnormality determination device 10 controls the engine 20.

The drive train abnormality determination device 10 includes an angle signal output unit 105, a fluctuation physical quantity acquisition part 11, a rough road determination part 12, a continuity determination part 13, and a drive train abnormality determination part 14. The drive train abnormality determination device 10 also includes a misfire determination part 15, a notification signal transmission part 16, and a combustion control part 17.

The fluctuation physical quantity acquisition part 11, the rough road determination part 12, the continuity determination part 13, the drive train abnormality determination part 14, the misfire determination part 15, the notification signal transmission part 16, and the combustion control part 17 are implemented as computer functions. The fluctuation physical quantity acquisition part 11 is an example of the rotator rotation speed fluctuation physical quantity acquisition unit. The rough road determination part 12 is an example of the rough road determination unit. The continuity determination part 13 is an example of the continuity determination unit. The drive train abnormality determination part 14 is an example of the drive train abnormality determination unit. The notification signal transmission part 16 is an example of the notification signal transmitter.

The angle signal output unit 105 periodically outputs an angle signal in accordance with rotation of the crankshaft 21 provided in the engine 20. The angle signal output unit 105 outputs an angle signal each time the crankshaft 21 rotates by a predetermined detection angle.

The fluctuation physical quantity acquisition part 11 acquires a rotation speed fluctuation physical quantity related to a fluctuation in the rotation speed of the crankshaft 21, based on a signal from the angle signal output unit 105.

More specifically, the fluctuation physical quantity acquisition part 11 acquires a rotation speed of the crankshaft 21. The fluctuation physical quantity acquisition part 11 uses the rotation speed to acquire a rotation speed fluctuation physical quantity.

Referring to the part (b) of FIG. 1 showing the rotation speed fluctuation physical quantity distribution, the solid line indicates a rotation speed fluctuation physical quantity distribution in a situation of a misfire occurring in flat road traveling. The rotation speed fluctuation physical quantity distribution in the situation of a misfire occurring in flat road traveling includes a rotation speed fluctuation physical quantity distribution E0 in a situation of a misfire not occurring in flat road traveling (normal situation) and a rotation speed distribution M0 in a situation of a misfire occurring in flat road traveling (misfire situation).

Figure 5:
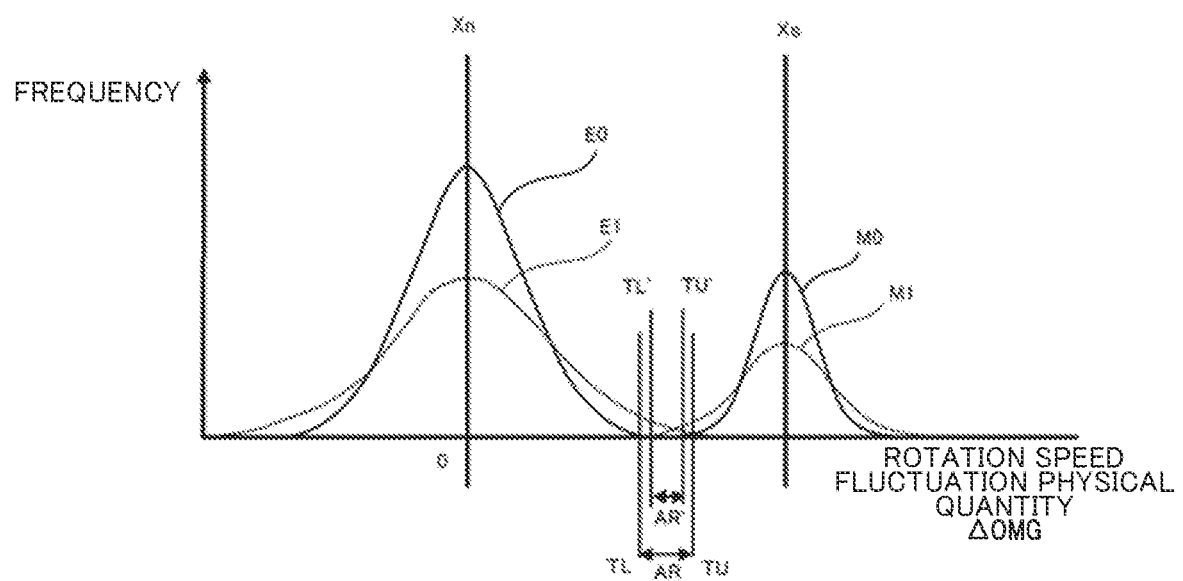
FIG. 5 A diagram illustrating a rotation speed fluctuation physical quantity distribution FIG. 6 A flowchart showing operations of the drive train abnormality determination device shown in FIG. 1

For example, in a rotation speed fluctuation physical quantity distribution shown in FIG. 5, there is an interval between a tail of the distribution E0 and a tail of the distribution M0. A rough road determination region AR is set between the tail of the distribution E0 and the tail of the distribution M0.

The misfire determination part 15 determines that the misfire situation is present, if the rotation speed fluctuation physical quantity is within a predetermined misfire determination range. More specifically, the misfire determination part 15 determines that a misfire has occurred, if a rotation speed fluctuation physical quantity acquired by the fluctuation physical quantity acquisition part 11 is greater than a misfire determination value. The misfire determination value is an upper limit reference TU of the rough road determination region AR.

Referring to the part (b) of FIG. 1, the broken line indicates a rotation speed fluctuation physical quantity distribution E1 in a normal situation with rough road and a rotation speed distribution M1 in a misfire situation with rough road. The distribution E1 in the normal situation with rough road has a tail wider than that of the distribution E0 in the normal situation with flat road. The distribution M1 in the misfire situation with rough road has a tail wider than that of the distribution M0 in the misfire situation with flat road. That is, the distributions E1 and M1 are spreading wider than the distributions E0 and M0, respectively.

The rough road determination part 12 makes a rough road determination by using the rotation speed fluctuation physical quantity distribution. The rough road determination part 12 determines whether or not a distribution based on rotation speed fluctuation physical quantities acquired by the fluctuation physical quantity acquisition part 11 satisfies a predetermined rough road condition. In detail, the rough road determination part 12 determines the presence of a rough road, if the frequency of rotation speed fluctuation physical quantities included in the rough road determination region AR is higher than a predetermined rough road reference.

When an abnormality is occurring in the drive train 59, even in flat road traveling, the rotation speed fluctuation physical quantity distribution is transformed like the distributions E1 and M1 indicated by the broken line in the part (b) of FIG. 1, which are distributions obtained in rough road.

Accordingly, results of rough road determinations made by the rough road determination part 12 contain a determination that is actually attributable to a rough road and a determination that is attributable to an abnormality of the drive train 59.

The continuity determination part 13 determines whether or not a determination result by the rough road determination part 12 indicating satisfaction of the rough road condition is continuing. More specifically, the continuity determination part 13 determines whether or not the rough road determination part 12 has been continuously determining fulfillment of the rough road condition for a period longer than an abnormality finalization reference. The abnormality finalization reference is, for example, a maximum period at least on the assumption that the straddled vehicle 50 travels on rough road a whole day without traveling on flat road.

Referring to the part (c) of FIG. 1, the rough road determination part 12 determines that the rough road condition is satisfied, if the frequency of rotation speed fluctuation physical quantities included in the rough road determination region AR exceeds the rough road reference in an accumulated period having a predetermined length (an accumulation of periods from time t1 to time t2 and from time t3 to time t4) (an accumulation of periods from time t4 to time t5 and from time t6 to time t7). In this case, the continuity determination part 13 counts a rough road continuing counter. If the frequency of the rotation speed fluctuation physical quantities does not exceed the rough road reference, the rough road continuing counter is initialized.

If the continuity determination part 13 determines that the determination result by the rough road determination part 12 is continuing, the drive train abnormality determination part 14 determines that the drive train 59 has an abnormality.

If the rough road continuing counter shown in the part (c) of FIG. 1 exceeds the predetermined abnormality finalization reference, the drive train abnormality determination part 14 determines that the rough road condition has been continuously fulfilled for a long period, and determines that the drive train 59 has an abnormality.

The notification signal transmission part 16 notifies a result of the determination made by the drive train abnormality determination part 14. If the drive train abnormality determination part 14 determines the presence of an abnormality of the drive train, the notification signal transmission part 16 causes a notification device 30 (see FIG. 3) to display the presence of an abnormality of the drive train. The notification signal transmission part 16 also causes the notification device 30 to display information on the abnormality of the drive train.

If the rough road determination part 12 detects traveling on rough road, the notification signal transmission part 16 outputs information to the notification device 30, the information indicating a result of the rough road traveling detection. If the misfire determination part 15 detects a misfire, the notification signal transmission part 16 outputs misfire information to the notification device 30, the misfire information indicating a result of the misfire detection. The notification signal transmission part 16 outputs information stored therein, when a diagnosis device serving as the notification device 30 becomes or is connected to the drive train abnormality determination device 10.

The drive train abnormality determination device 10 according to an embodiment is able to determine an abnormality of the drive train 59 by performing a determination of continuity of a determination result in addition to a determination of traveling on rough road that uses a fluctuation in the rotation speed of the crankshaft 21. Accordingly, the determination of traveling on rough road and the determination of an abnormality of the drive train 59 can be implemented with a simple configuration. Consequently, an abnormality of the drive train provided in the straddled vehicle can be determined with a simple configuration.

The drive train abnormality determination device will now be detailed.

FIG. 2 is a view showing an external appearance of the straddled vehicle equipped with the drive train abnormality determination device shown in FIG. 1.

The straddled vehicle 50 shown in FIG. 2 includes a vehicle body 51 and wheels 52a, 52b. The wheels 52a, 52b are supported by the vehicle body 51. The straddled vehicle 50 is a motorcycle with two wheels 52a, 52b. The wheels 52a, 52b provided to the vehicle body 51 of the straddled vehicle 50 are disposed one behind the other in a front-rear direction X of the straddled vehicle 50. The rear wheel 52b is a driving wheel.

The straddled vehicle 50 includes the drive train abnormality determination device 10, the engine 20, and the drive train 59. More specifically, the straddled vehicle 50 includes an engine unit EU and the drive train 59. The engine unit EU includes the drive train abnormality determination device 10 and the engine 20.

The engine 20 is a four-stroke engine. The drive train abnormality determination device 10 and the engine 20 are attached to the vehicle body 51.

The drive train 59 drives the straddled vehicle 50 by transmitting power of the engine 20.

The drive train 59 has a transmission 58, a wrapping transmission element 59a, and transmission wheels 59b. The crankshaft 21 of the engine 20 (see FIG. 3) has a function as the drive train 59, too. The wheel 52b as the driving wheel has a function as the drive train 59, too.

The wrapping transmission element 59a, which is endless, is wrapped around plural transmission wheels 59b. As the transmission wheels 59b rotate, the wrapping transmission element 59a circularly moves. In this embodiment, the wrapping transmission element 59a is configured to be engaged with the plural transmission wheels 59b. The wrapping transmission element 59a is a chain or a belt. The transmission wheels 59b are sprockets or pulleys.

Figure 3:
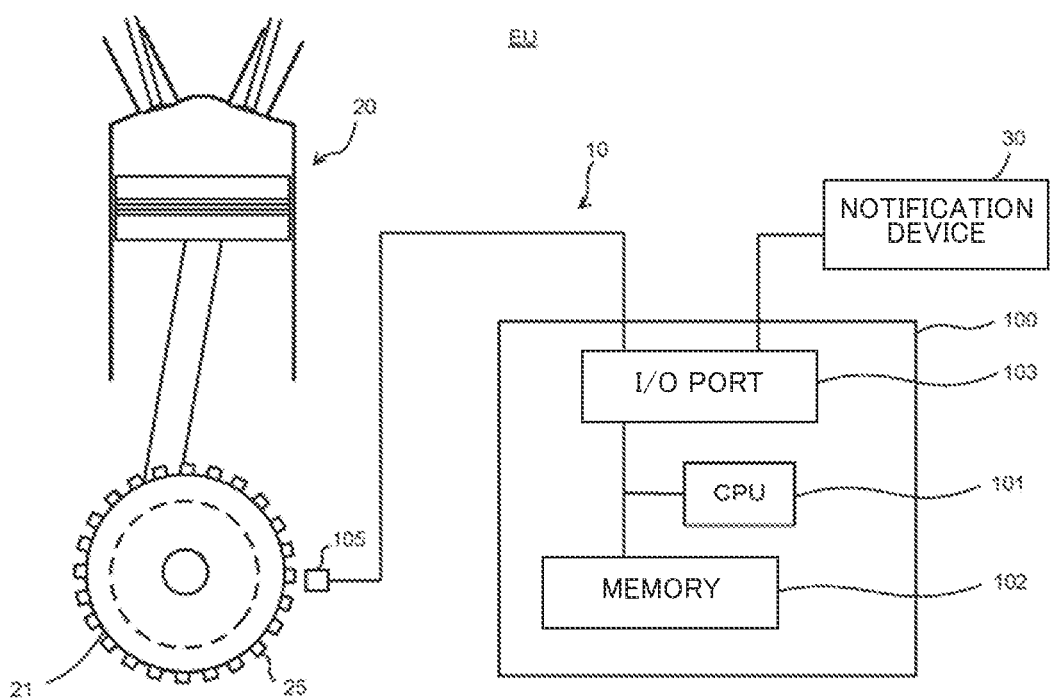
FIG. 3 A configuration diagram schematically showing configurations of the drive train abnormality determination device shown in FIG. 1 as well as peripheral devices thereof.

FIG. 3 is a configuration diagram schematically showing configurations of the drive train abnormality determination device shown in FIG. 1 as well as peripheral devices thereof.

The drive train abnormality determination device 10 shown in FIG. 3 is a device related to the engine 20. The engine 20 according to this embodiment is a three-cylinder engine.

The engine 20 includes the crankshaft 21. The crankshaft 21 corresponds to an example of the rotator of the present teaching. The crankshaft 21 rotates in accordance with operations of the engine 20. That is, the crankshaft 21 is rotated by the engine 20. The crankshaft 21 has two or more detection object portions 25 for use to detect rotation of the crankshaft 21. The detection object portions 25 are arranged at intervals in the circumferential direction of the crankshaft 21, the intervals corresponding to predetermined detection angles relative to the center of rotation of the crankshaft 21. For instance, each of the detection angles is 15 degrees. The detection object portions 25 move as the crankshaft 21 rotates.

Upon detecting passing of any detection object portion 25, the angle signal output unit 105 outputs a signal. Consequently, the angle signal output unit 105 periodically outputs an angle signal in accordance with rotation of the crankshaft 21.

A computer 100 that configures the drive train abnormality determination device 10 includes a CPU 101, a memory 102, and an I/O port 103.

The CPU 101 executes a computing process based on a control program. The memory 102 stores the control program and information necessary for computation. The I/O port 103 inputs and outputs signals to and from an external device.

Connected to the I/O port 103 is the angle signal output unit 105. The angle signal output unit 105 outputs the angle signal each time the crankshaft 21 of the engine 20 rotates by the detection angle.

Also connected to the I/O port 103 is the notification device 30. The notification device 30 displays information based on a signal outputted from the drive train abnormality determination device 10. The notification device 30 is, for example, a display lamp provided to the straddled vehicle 50. The notification device 30 encompasses a diagnosis device, which is an external device of the straddled vehicle 50, for example.

The drive train abnormality determination device 10 according to this embodiment detects a misfire in the engine 20 based on the rotation speed of the crankshaft 21. The drive train abnormality determination device 10 according to this embodiment has a function as an engine control unit (ECU) that controls operations of the engine 20, too. An intake air pressure sensor, a fuel injection device, and a spark plug, all of which are not shown, are connected to the drive train abnormality determination device 10.

The fluctuation physical quantity acquisition part 11, the rough road determination part 12, the continuity determination part 13, the drive train abnormality determination part 14, the misfire determination part 15, the notification signal transmission part 16, and the combustion control part 17 shown in FIG. 1 are implemented by hardware shown in FIG. 3 being controlled by the CPU 101 (see FIG. 3) that executes the control program.

The fluctuation physical quantity acquisition part 11 shown in the part (a) of FIG. 1 will be detailed.

The fluctuation physical quantity acquisition part 11 acquires a rotation speed fluctuation physical quantity on the crankshaft 21 based on an angle signal received from the angle signal output unit 105 (see FIG. 3). The angle signal is outputted as the crankshaft 21 rotates by every detection angle.

The fluctuation physical quantity acquisition part 11 acquires a rotation speed by measuring a time interval of timings at which the angle signal output unit 105 outputs a signal. The fluctuation physical quantity acquisition part 11 also acquires a rotation speed fluctuation physical quantity. The rotation speed fluctuation physical quantity acquired by the fluctuation physical quantity acquisition part 11 is a rotation speed fluctuation physical quantity on the engine 20.

A fluctuation in the rotation speed of the engine 20 includes a fluctuation attributable to combustion of the engine 20. The fluctuation attributable to combustion of the engine 20 has an angular period equal to or shorter than a crank angle that corresponds to four strokes.

The fluctuation in the rotation speed of the engine 20 may sometimes include not only the fluctuation attributable to combustion of the engine 20 but also a fluctuation attributable to traveling on rough road. The fluctuation in the rotation speed of the engine 20 may also include a fluctuation attributable to an abnormality of the drive train 59. The rough road traveling and the abnormality of the drive train 59 are external factors of the engine 20.

The fluctuation physical quantity acquisition part 11, for example, acquires a rotation speed in a section of 180 crank angle degrees corresponding to a combustion stroke of each cylinder and a rotation speed in a section of 180 crank angle degrees corresponding to strokes between combustion strokes.

The fluctuation physical quantity acquisition part 11 calculates the amount of fluctuation in the rotation speed of the engine 20, corresponding to cylinders that successively undergo strokes of the same kind. Based on this amount of fluctuation, the fluctuation physical quantity acquisition part 11 acquires a rotation speed fluctuation physical quantity.

Figure 4:
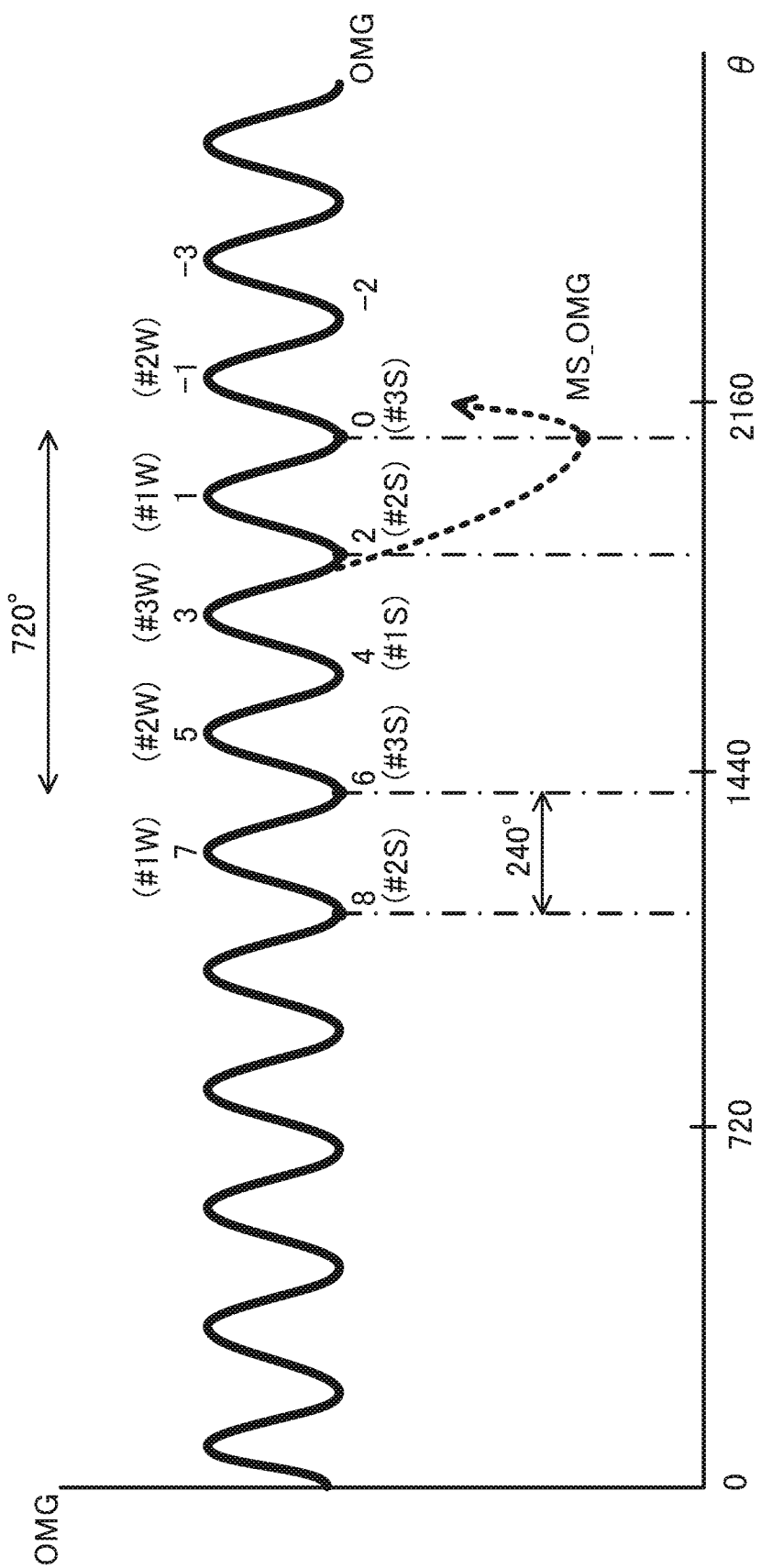
FIG. 4 A chart showing an exemplary rotation speed of a crankshaft

FIG. 4 is a chart showing an exemplary rotation speed of the crankshaft 21.

In the graph of FIG. 4, the horizontal axis represents the rotation angle θ of the crankshaft 21, and the vertical axis represents the rotation speed. In the example illustrated in FIG. 4, a fluctuation attributable to external factors of the engine 20 is not considered, for ease of understanding the relationship of the rotation speed.

The graph of FIG. 4 outlines a fluctuation in the rotation speed OMG. A graph of the rotation speed OMG is obtained by connecting with a curved line a rotation speed value calculated at a crank angle corresponding to a combustion stroke and a rotation speed value calculated at a crank angle corresponding to an intake stroke.

The graph of FIG. 4 indicates a transition of the rotation speed OMG over the crank angle, instead of a transition of the rotation speed over time.

A rotation fluctuation attributable to the combustion operation has cycle periods in each 720 crank angle degrees. The number of the cycle periods corresponds to the number of cylinders. The engine 20 of this embodiment is a three-cylinder four-stroke engine of equal interval combustion type. The rotation fluctuation in the rotation speed OMG shown in FIG. 4 has three cycle periods in each 720 crank angle degrees. That is, the rotation fluctuation attributable to the combustion operation of the engine 20 has a period shorter than the crank angle (720 degrees) corresponding to four strokes. A peak of the rotation speed corresponding to a compression stroke of the cylinder, appears every 240 crank angle degrees.

In the graph of FIG. 4, a crank angle position serving as a detection object at a certain time point is numbered "0". Starting from the position "0", every 120 crank angle degrees is numbered in order. In the example illustrated in FIG. 4, the intake stroke (#3S) of a third cylinder out of the three cylinders is set as the position "0", which serves as the detection object at the certain time point. The position "0" is a position intermediate between the position "1", which corresponds to the combustion stroke (#1W) of a first cylinder, and the position "−1", which corresponds to the combustion stroke (#2W) of a second cylinder. The positions "2", "4", and "6" correspond to the intake strokes (#2S, #1S, #3S) of the second, first, and third cylinders, respectively.

Values of the rotation speed OMG at the positions "0", "1", "2", . . . are expressed as OMG0, OMG1, OMG2, . . . . A rotation speed of the crankshaft 21 acquired by the fluctuation physical quantity acquisition part 11 is a rotation speed of the engine 20. Thus, descriptions will be given on the assumption that the rotation speed OMG of the crankshaft 21 is the rotation speed OMG of the engine 20.

The fluctuation physical quantity acquisition part 11 calculates a difference between rotation speeds corresponding to cylinders that successively undergo strokes of the same kind. As the rotation speeds, the fluctuation physical quantity acquisition part 11 uses rotation speeds OMG of the engine 20. The difference thus calculated serves as a first fluctuation amount. For example, given that the position "0" in FIG. 4 serves as the detection object, the positions "0" and "2" are crank angle positions corresponding to cylinders that successively undergo strokes of the same kind. For example, the position "2" corresponds to the intake stroke (#2S in FIG. 4) of the second cylinder. The position "0" corresponds to the intake stroke (#3S in FIG. 4) of the third cylinder. That is, the intake stroke of the second cylinder and the intake stroke of the third cylinder successively occur at the positions "2" and "0". The first fluctuation amount is a difference between a rotation speed OMG2 and a rotation speed OMG0. Here, the rotation speed OMG2 is a rotation speed at the position "2" shown in FIG. 4. The rotation speed OMG0 is a rotation speed at the position "0".

The fluctuation physical quantity acquisition part 11 further calculates a difference between rotation speeds corresponding to cylinders that successively undergo strokes of the same kind at positions 720 crank angle degrees before the positions of the crankshaft 21 at which the first fluctuation amount was calculated. This difference serves as a second fluctuation amount. The positions of the crankshaft 21 preceding by 720 crank angle degrees and corresponding to the cylinders that successively undergo strokes of the same kind are the positions "6" and "8". The second fluctuation amount is a difference between a rotation speed OMG8 and a rotation speed OMG6. Here, the rotation speed OMG6 is a rotation speed OMG of the engine 20 at the position "6". The rotation speed OMG8 is a rotation speed at the position "8".

The fluctuation physical quantity acquisition part 11 also calculates a difference between the first fluctuation amount and the second fluctuation amount, as a rotation speed fluctuation physical quantity ΔOMG. The fluctuation physical quantity acquisition part 11 outputs the difference thus calculated, as a rotation speed fluctuation physical quantity.

The misfire determination part 15 shown in FIG. 1 determines that a misfire situation is present, if the rotation speed fluctuation physical quantity ΔOMG is within a predetermined misfire determination range.

In FIG. 4, the broken line MS_OMG indicates a rotation speed fluctuation in a misfire situation. The broken line MS_OMG outlines a rotation speed fluctuation in a misfire situation, in the combustion stroke (#1W) of the first cylinder. If a misfire occurs, a rise in the rotation speed caused by combustion does not occur, so that the rotation speed keeps lowering in a period from the combustion stroke (#3W) of the cylinder before the first cylinder to the combustion stroke (#2W) of the cylinder next to the first cylinder. Thus, the rotation speed OMG0 at the position "0" is lower than that in a normal situation having no misfire. Accordingly, the first fluctuation amount at the position "0" increases as compared to that in a normal situation having no misfire. In this case, the rotation speed fluctuation physical quantity ΔOMG at the position "0" is greater than that in a normal situation having no misfire.

The first fluctuation amount or the second fluctuation amount increases also when, for example, the engine rotation is accelerated or decelerated by control. In this embodiment, the misfire determination part 15 determines the rotation speed fluctuation physical quantity ΔOMG acquired by calculation of the difference between the first fluctuation amount and the second fluctuation amount. The acceleration or deceleration of the engine rotation caused by control is less influential, therefore. In addition, a change in the rotation speed fluctuation physical quantity ΔOMG after elapse of a 720 crank angle degrees period is determined, so that a change in the rotation speed between strokes of the same kind is determined. At which crank angle position an object whose change is to be determined locates is less influential, therefore. Accordingly, the acceleration or deceleration caused by control is less influential to a misfire detection and a rough road detection.

The rotation speed fluctuation physical quantity ΔOMG increases in a normal situation different from the misfire situation, too, such as when the straddled vehicle 50 (see FIG. 2) equipped with the engine 20 travels on rough road instead of flat road. When the straddled vehicle 50 travels on rough road, a fluctuation in the load attributable to unevenness of the road surface, etc. is transmitted from the wheel 52b (see FIG. 2) to the crankshaft 21 of the engine 20 via the drive train 59 and the like. As a result, the rotation speed OMG fluctuates. Consequently, the rotation speed fluctuation physical quantity ΔOMG fluctuates. If a fluctuation attributable to traveling on rough road, which is included in a fluctuation in the rotation speed fluctuation physical quantity ΔOMG, increases, the misfire determination part 15 cannot perform a precise determination of a misfire.

A fluctuation in the rotation speed fluctuation physical quantity ΔOMG attributable to anything other than a misfire can include a rotation fluctuation attributable to an abnormality of the drive train 59.

An abnormality of the drive train 59 is caused by, for example, deformation of a part of a component part of the drive train 59, the deformation being due to deterioration of the component part. For example, when the wrapping transmission element 59a included in the drive train 59 is a belt, the rotation speed fluctuation physical quantity ΔOMG is influenced by a reduction of the width of a part of the belt. When the wrapping transmission element 59a included in the drive train 59 is a chain, the rotation speed fluctuation physical quantity ΔOMG is influenced by stretching of a part of a link constituting the chain.

An abnormality of the drive train 59 is related to the structure of the drive train 59 itself. Thus, a fluctuation in the rotation speed fluctuation physical quantity ΔOMG attributable to an abnormality of the drive train 59 is different from a temporary fluctuation like the one observed when the vehicle travels on rough road, for example. The fluctuation in the rotation speed fluctuation physical quantity ΔOMG attributable to an abnormality of the drive train 59 is constantly influential to the accuracy of misfire detection. That is, the accuracy of the determination by the misfire determination part 15 is constantly lowered. The accuracy of misfire determination is restored by replacement or repair of an abnormal component part. Accordingly, a mechanism in which an abnormality of the drive train 59 influences the rotation speed fluctuation physical quantity ΔOMG is intrinsically different from a mechanism related to traveling on rough road. In the rotation speed fluctuation physical quantity ΔOMG, however, a variation in the rotation speed fluctuation physical quantity ΔOMG caused by an abnormality of the drive train 59 closely resembles a variation in the rotation speed fluctuation physical quantity ΔOMG caused by traveling on rough road.

FIG. 5 is a diagram illustrating a rotation speed fluctuation physical quantity distribution.

In FIG. 5, the solid lines indicate distributions E0 and M0 of the rotation speed fluctuation physical quantity ΔOMG obtained when a misfire occurs in flat road traveling. More specifically, a rotation speed fluctuation physical quantity distribution obtained when a misfire occurs in flat road traveling includes the distribution E0 of rotation speed fluctuation physical quantities ΔOMG obtained when no misfire occurs in flat road traveling (normal situation) and the distribution M0 of the rotation speeds obtained when a misfire occurs (misfire situation). Each of the distributions E0 and M0 is a normal distribution or substantially a normal distribution.

In the example illustrated in FIG. 5, there is an interval between a tail of the distribution E0 of rotation speed fluctuation physical quantities ΔOMG in the normal situation and a tail of the distribution M0 of rotation speed fluctuation physical quantities ΔOMG in the misfire situation.

The relationship between the tail of the distribution E0 of rotation speed fluctuation physical quantities ΔOMG in the normal situation and the tail of the distribution M0 of rotation speed fluctuation physical quantities ΔOMG in the misfire situation depends on an operating state of the engine 20, too.

The engine 20 is mounted to the straddled vehicle 50, and therefore is configured such that the crankshaft 21 has a reduced moment of inertia. Thus, when the engine 20 operates in a high load and high rotation region, the interval shown in FIG. 5 is likely to occur between the tail of the distribution E0 and the tail of the distribution M0. When the engine 20 operates in a low load region or in a high rotation region, on the other hand, the interval between the tail of the distribution E0 and the tail of the distribution M0 is narrower than that shown in FIG. 5, or the distribution E0 and the distribution M0 are connected.

The drive train abnormality determination device 10 determines a rough road and determines an abnormality of the drive train, by using the interval that occurs between the tail of the distribution E0 and the tail of the distribution M0 when the engine 20 operates in the high load and high rotation region. Accordingly, the drive train abnormality determination device 10 determines an abnormality of the drive train when, as an engine determination condition, the engine 20 operates in the high load and high rotation region.

A rotation speed corresponding to the high load and high rotation speed region is, specifically, not particularly limited. A rotation speed corresponding to the high load and high rotation speed region may be positioned in, for example, a region not less than 6000 rpm, not less than 8000 rpm, not less than 9000 rpm, or not less than 10000 rpm. In these cases, a rotation speed corresponding to the low load and low rotation speed region is positioned in a region lower than the rotation speed corresponding to the high load and high rotation speed region.

A load corresponding to each of the high load and high rotation speed region and the low load and low rotation speed region is, specifically, not particularly limited. The load varies depending on specifications of the vehicle and/or the internal combustion engine, and also varies depending on how the load is detected. A specific numerical value of the load is not particularly limited. A high load corresponds to a load generated when, for example, the vehicle accelerates, travels uphill, or travels at a high speed so as to maintain high speed rotation of the internal combustion engine. A low load corresponds to a load generated when, for example, the vehicle is in steady operation, decelerates, or travels downhill. The high load and the low load can be relatively identified by the relationship therebetween.

As shown in FIG. 5, the rough road determination region AR is set between the distribution E0 in the normal situation with flat road and the distribution M0 in the misfire situation with flat road. The rough road determination region AR has its lower limit reference TL and upper limit reference TU set between a physical quantity corresponding to a peak Xn of the distribution E0 in the normal situation and a physical quantity corresponding to a peak Xs of the distribution M0 in the misfire situation. The lower limit reference TL is lower than the upper limit reference TU. The rough road determination region AR is disposed in the interval between the tail of the distribution of rotation speed fluctuation physical quantities ΔOMG in the normal situation and the tail of the distribution of rotation speed fluctuation physical quantities ΔOMG in the misfire situation.

If a rotation speed fluctuation physical quantity ΔOMG is greater than the upper limit reference TU of the rough road determination region AR, the misfire determination part 15 determines the presence of a misfire. If a rotation speed fluctuation physical quantity ΔOMG is smaller than the lower limit reference TL of the rough road determination region AR, the misfire determination part 15 determines that it is not a misfire situation but a normal situation.

In FIG. 5, the broken line indicates the distribution E1 of rotation speed fluctuation physical quantities ΔOMG in the normal situation with rough road and the distribution M1 of rotation speeds in the misfire situation with rough road.

Each of the distributions E1 and M1 is a normal distribution or substantially a normal distribution. A physical quantity corresponding to a peak of the distribution E1 in the normal situation with rough road is substantially equal to the physical quantity corresponding to the peak Xn of the distribution E1 in the normal situation with flat road. The distribution E1 in the normal situation with rough road has a wider tail and a lower peak than those of the distribution E0 in the normal situation with flat road. A rotation speed fluctuation physical quantity ΔOMG corresponding to a peak of the distribution M1 in the misfire situation with rough road is substantially equal to the physical quantity corresponding to the peak Xs of the distribution M1 in the misfire situation with flat road. The distribution M1 in the misfire situation with rough road has a wider tail and a lower peak than those of the distribution M0 in the misfire situation with flat road. In a case of a rough road, therefore, both the rotation speed fluctuation physical quantities ΔOMG in the normal situation and the rotation speed fluctuation physical quantities ΔOMG in the misfire situation are more frequently included in the rough road determination region AR.

The rough road determination part 12 determines the presence of a rough road, by using a distribution of rotation speed fluctuation physical quantities ΔOMG. If the frequency of rotation speed fluctuation physical quantities ΔOMG included in the rough road determination region AR is more than the rough road reference, the rough road determination part 12 determines that a rough road is present. In more detail, if the frequency of rotation speed fluctuation physical quantities ΔOMG included in the rough road determination region AR in a predetermined determination period is more than the rough road reference, the rough road determination part 12 determines that a rough road is present. Specifically, if the frequency of rotation speed fluctuation physical quantities ΔOMG that are greater than the lower limit reference TL of the rough road determination region AR and smaller than the upper limit reference TU of the rough road determination region AR is more than the rough road reference, the rough road determination part 12 determines that a rough road is present.

If the rough road determination part 12 determines that a rough road is present, the result of the misfire determination by the misfire determination part 15 is made ineffective.

A distribution of rotation speed fluctuation physical quantities ΔOMG varies depending on an abnormality of the drive train 59, too. Even in flat road traveling, a distribution of rotation speed fluctuation physical quantities ΔOMG in a case of the drive train 59 having an abnormality is transformed like the distributions E1 and M1, which are obtained in rough road. Thus, a distribution in a case of the drive train 59 having an abnormality has a wider tail and a lower peak than those of the distributions E0 and M0 in flat road, like the distributions E1 and M1 in a case of a rough road, for example.

Herein, a description will be given on the assumption that the distributions E1 and M1 shown in FIG. 5 are distributions in a case of the drive train 59 having an abnormality.

A case of the drive train 59 having an abnormality and a case of a rough road are different in terms of a period for which a distribution of rotation speed fluctuation physical quantities ΔOMG continues.

An abnormality of the drive train 59 is normally an irreversible phenomenon caused by deterioration of the drive train 59. Therefore, the distributions E1 and M1 of rotation speed fluctuation physical quantities ΔOMG resulting from transformation due to an abnormality of the drive train 59 continue for a long period.

A distribution in a case of a rough road, on the other hand, returns from the distributions E1 and M1 to the distributions E0 and M0 as a road on which the straddled vehicle is traveling changes from the rough road to a flat road.

The drive train abnormality determination device 10 uses this difference in the continuation period, to distinguish the abnormality of the drive train 59.

Specifically, the continuity determination part 13 determines whether or not a determination result by the rough road determination part 12 indicating satisfaction of the rough road condition is continuing. If the continuity determination part 13 determines that the determination result by the rough road determination part 12 is continuing, it is determined that the drive train 59 has an abnormality.

More specifically, the continuity determination part 13 determines whether or not the rough road determination part 12 has been continuously determining fulfillment of the rough road condition for a period longer than the abnormality finalization reference. Set as the abnormality finalization reference is an assumed maximum period of a rough road. The assumed maximum period of a rough road is a maximum period assumed to be an accumulation of periods for which the straddled vehicle 50 travels on rough road without interposition of flat road traveling. For example, in a case where the straddled vehicle 50 stops in the middle of traveling on rough road and then travels on the rough road again, a period during which the rough road condition has been satisfied is continuously accumulated. For example, in a case where the rough road condition is not satisfied because of interposition of flat road traveling by the straddled vehicle 50, a count value indicating a period during which the rough road condition has been satisfied is initialized.

In more detail, if the rough road determination part 12 determines that the rough road condition is satisfied, the continuity determination part 13 counts the rough road continuing counter. If the rough road determination part 12 determines that the rough road condition is not satisfied, the continuity determination part 13 initializes the rough road continuing counter. If the rough road continuing counter is more than the abnormality finalization reference, the continuity determination part 13 determines that the determination result is continuing.

The assumed maximum period of a rough road, which is set as the abnormality finalization reference, is a maximum period at least on the assumption that the straddled vehicle 50 travels on rough road a whole day without traveling on flat road. This is based on a rule of thumb that the straddled vehicle 50 traveling a whole day would normally travel on flat road at some time in the day. The abnormality finalization reference is set in units of engine rotations.

If the determination by the rough road determination part 12 indicating satisfaction of the rough road condition is continuing for a period longer than the maximum period, which is at least on the assumption that the straddled vehicle 50 travels on rough road a whole day, the continuity determination part 13 determines that the determination result is continuing.

In some cases, long period longer than the above-described period may be set as the abnormality finalization reference. For example, the abnormality finalization reference varies depending on a type of the straddled vehicle 50. For instance, when the straddled vehicle 50 is an off-road vehicle, a period longer than the above-described period can be set. For example, a period required to travel across a continent is set as the assumed maximum period of a rough road.

A condition under which the rough road determination part 12 determines that the rough road condition is satisfied differs between a case of the drive train 59 having an abnormality and a case of a rough road. The difference is as follows. It is difficult that the straddled vehicle 50 travels on rough road at a high speed. Therefore, an influence of a rough road is not likely to occur while the straddled vehicle 50 is traveling at a high speed.

Accordingly, the drive train abnormality determination device 10 also uses a difference in the traveling speed condition, to distinguish the abnormality of the drive train 59.

To be specific, the continuity determination part 13 determines whether or not a determination result by the rough road determination part 12 indicating satisfaction of the rough road condition is continuing while the straddled vehicle 50 is traveling at a speed higher than an upper limit set speed at which the straddled vehicle 50 is able to travel on rough road. If the continuity determination part 13 determines that the determination result by the rough road determination part 12 indicating satisfaction of the rough road condition is continuing while the straddled vehicle 50 is traveling at a speed higher than the upper limit set speed at which the straddled vehicle 50 is normally able to travel on rough road, the drive train abnormality determination part 14 determines that the drive train 59 has an abnormality.

The upper limit set speed is the upper limit of a speed at which traveling on rough road is considered as possible. The upper limit set speed is 60 km per hour, for example. Depending on the performance and size of the straddled vehicle 50 itself, the upper limit set speed may be set higher. The upper limit set speed can be set at 80 km per hour, for example. A high speed traveling reference can be set at 100 km per hour, for example.

Figure 6:
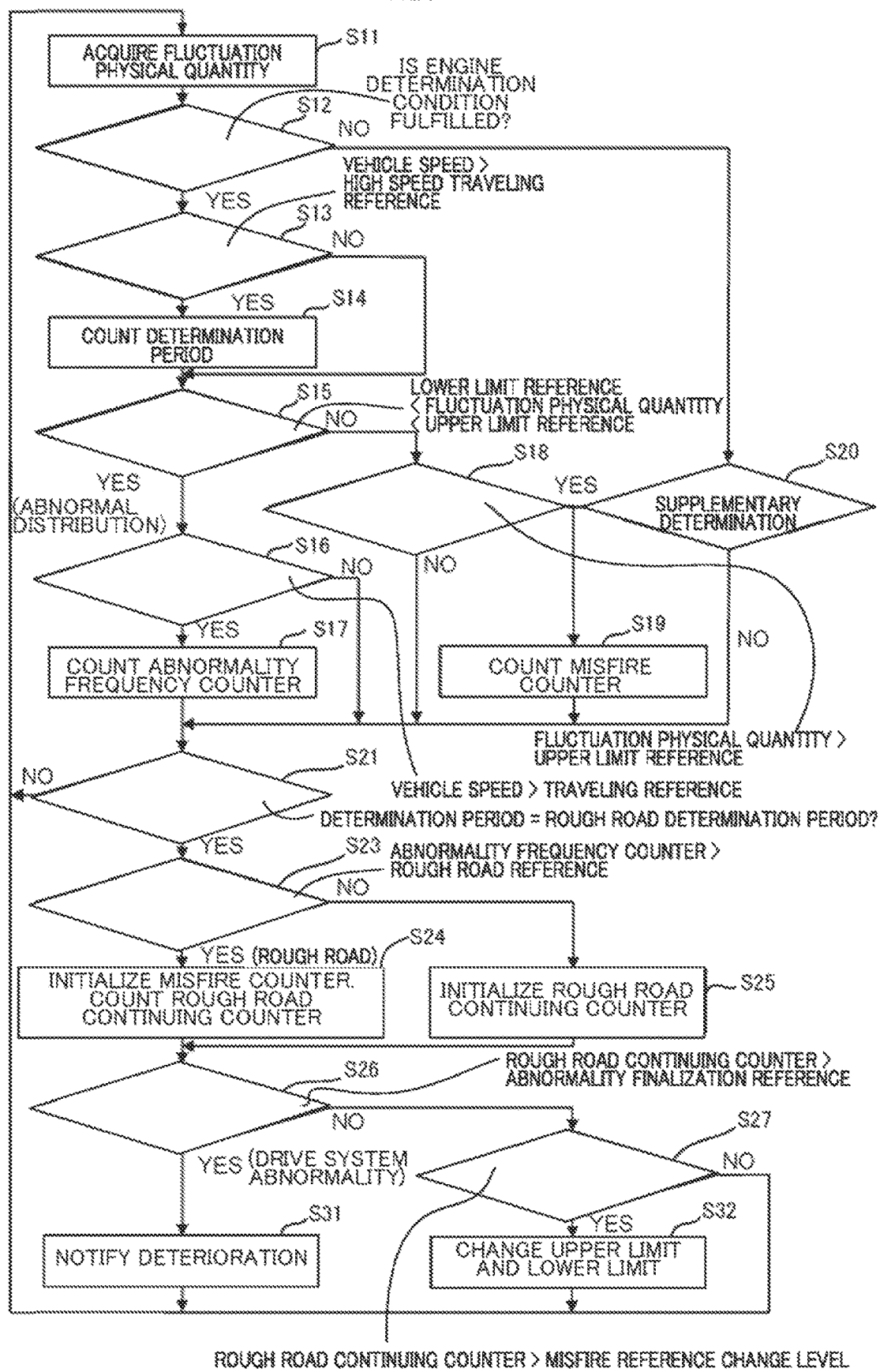

FIG. 6 is a flowchart showing operations of the drive train abnormality determination device shown in FIG. 1.

Referring to FIG. 6, operations of the drive train abnormality determination device 10 shown in FIG. 1 will be described.

The fluctuation physical quantity acquisition part 11 acquires a rotation speed fluctuation physical quantity ΔOMG on the crankshaft 21 of the engine 20 (S11).

The fluctuation physical quantity acquisition part 11 acquires a rotation speed fluctuation physical quantity ΔOMG on the crankshaft 21 based on an angle signal outputted from the angle signal output unit 105. The fluctuation physical quantity acquisition part 11 acquires a rotation speed fluctuation physical quantity ΔOMG each time the crankshaft 21 rotates by a predetermined rotation angle.

More specifically, the fluctuation physical quantity acquisition part 11 acquires a rotation speed fluctuation physical quantity ΔOMG when each stroke of a specific kind (for example, at the positions of "#1S", "#2S", and "#3S" in FIG. 4) comes in each cylinder of the engine 20.

Then, the continuity determination part 13 distinguishes whether or not the engine determination condition required for determining a rough road is fulfilled (S12). More specifically, the continuity determination part 13 distinguishes whether or not the engine 20 is operating in the high load and high rotation region, which is the engine determination condition.

If the engine 20 is operating in the high load and high rotation region (Yes in S12), a rough road determination is performed by using the rotation speed fluctuation physical quantity ΔOMG, so that noise contained in a determination result can be reduced.

If the engine determination condition is fulfilled (Yes in S12), the continuity determination part 13 determines whether or not the vehicle speed of the straddled vehicle 50 is higher than the high speed traveling reference (S13). The high speed traveling reference is normally the upper limit of a speed at which the straddled vehicle 50 is able to travel on rough road. The vehicle speed being higher than the high speed traveling reference (Yes in S13) means that it is not a rough road. If the vehicle speed is higher than the high speed traveling reference (Yes in S13), the continuity determination part 13 counts a determination period (S14). The determination period corresponds to a cycle at which the rough road determination is performed. If the vehicle speed is equal to or lower than the high speed traveling reference (No in S13), the continuity determination part 13 skips counting of the determination period.

Then, the rough road determination part 12 determines whether or not the rotation speed fluctuation physical quantity ΔOMG acquired by the fluctuation physical quantity acquisition part 11 is within the rough road determination region AR (see FIG. 5) (S15). To be specific, the rough road determination part 12 determines whether or not the rotation speed fluctuation physical quantity ΔOMG is greater than the lower limit reference TL of the rough road determination region AR and smaller than the upper limit reference TU of the rough road determination region AR. If the rotation speed fluctuation physical quantity ΔOMG is within the predetermined rough road determination region AR (Yes in S15), it is probable that traveling on rough road or an abnormality of the drive train is occurring.

The rough road determination part 12 determines whether or not the vehicle speed of the straddled vehicle 50 is higher than the high speed traveling reference (S16). If the vehicle speed of the straddled vehicle 50 is higher than the high speed traveling reference (Yes in S13), the continuity determination part 13 counts an abnormality frequency counter (S17).

If the rotation speed fluctuation physical quantity ΔOMG is not within the rough road determination region AR (No in S15), the misfire determination part 15 determines whether or not a misfire condition is satisfied (S18). If the rotation speed fluctuation physical quantity ΔOMG is greater than the upper limit reference TU of the rough road determination region AR (see FIG. 5), the misfire determination part 15 determines that the misfire condition is satisfied (Yes in S18).

If a result of the determination in step S18 indicates satisfaction of the misfire condition (Yes in S18), the misfire determination part 15 counts a misfire counter (S19).

If the rotation speed fluctuation physical quantity ΔOMG is neither within the rough road determination region AR nor satisfying the misfire condition (No in S18), the misfire determination part 15 determines that there is no abnormality in the engine 20 and in the drive train 59.

If a result of the determination in step S12 mentioned above indicates that it is not easy to determine a rough road by using whether the rotation speed fluctuation physical quantity ΔOMG is large or small, the misfire determination part 15 performs a supplementary determination (S20). The supplementary determination is a determination using a method other than whether the rotation speed fluctuation physical quantity ΔOMG is large or small. The supplementary determination is, for example, a determination based on a fluctuation pattern of the rotation speed fluctuation physical quantity ΔOMG. If the supplementary determination results in determining that the misfire condition is satisfied (Yes in S20), the misfire determination part 15 counts the misfire counter (S19).

Then, the rough road determination part 12 determines whether or not the rough road determination period has elapsed (S21). In detail, the continuity determination part 13 determines whether or not the counted determination period is equal to the rough road determination period. The counted determination period being equal to the rough road determination period means that the engine determination condition is fulfilled and additionally an accumulation of periods for which the high speed traveling condition is fulfilled is equal to the rough road determination period.

If the rough road determination period has elapsed (Yes in S21), the rough road determination part 12 performs a rough road determination (S23). The rough road determination part 12 determines whether or not a distribution state based on rotation speed fluctuation physical quantities ΔOMG satisfies a predetermined rough road condition. In detail, the rough road determination part 12 determines whether or not the abnormality frequency counter counted in the determination period is more than the rough road reference.

The abnormality frequency counter being more than the rough road reference (Yes in S23) means that the distribution of rotation speed fluctuation physical quantities ΔOMG is spreading like E1 and M1 shown in FIG. 5. If the abnormality frequency counter is more than the rough road reference (Yes in S23), the rough road determination part 12 determines the presence of a rough road. In this case, the rough road determination part 12 initializes the misfire counter (S24). This is because in a case of a rough road, the result of the misfire determination (S18, S20) does not precisely reflect a misfire in the engine 20.

If the abnormality frequency counter is more than the rough road reference (Yes in S23), there is a possibility that the drive train 59 has an abnormality. That is, both a possible rough road and a possible abnormality of the drive train 59 are mixed in determinations by the rough road determination part 12. The continuity determination part 13 counts the rough road continuing counter (S24).

If the abnormality frequency counter is equal to or less than the rough road reference (No in S23), the rough road determination part 12 determines that the straddled vehicle 50 is traveling on flat road. If the abnormality frequency counter is equal to or less than the rough road reference (No in S23), the continuity determination part 13 determines that there is substantially no abnormality of the drive train 59, and initializes the rough road continuing counter (S25).

Then, the continuity determination part 13 determines whether or not the drive train has an abnormality (S26). The continuity determination part 13 finalizes the abnormality of the drive train based on whether or not the determination that the rough road condition is satisfied is continuing. More specifically, the continuity determination part 13 determines whether or not the rough road continuing counter is more than the abnormality finalization reference.

If the rough road continuing counter is more than the abnormality finalization reference (Yes in S26), the drive train abnormality determination part 14 determines that the drive train 59 has an abnormality.

If the drive train abnormality determination part 14 determines that the drive train 59 has an abnormality (Yes in S26), the notification signal transmission part 16 transmits a notification signal to the notification device 30 (S31). Consequently, the notification device 30 notifies a rider or a maintenance person of the abnormality of the drive train.

If the rough road continuing counter is equal to or less than the abnormality finalization reference (No in S26) and more than a misfire reference change level (Yes in S27), the misfire determination part 15 changes the misfire condition (S32). In detail, the misfire determination part 15 changes the upper limit reference TU and the lower limit reference TL of the rough road determination region AR. In more detail, the misfire determination part 15 reduces the upper limit reference of the rough road determination region AR shown in FIG. 5, from TU to TU'.

If the rough road continuing counter is equal to or less than the abnormality finalization reference (No in S26) and more than the misfire reference change level (Yes in S27), the degree of the abnormality of the drive train is low. For example, the drive train is in an early stage of deterioration. Although a misfire can be detected, a distribution of rotation speed fluctuation physical quantities $\Delta$OMG spreads as compared to a perfectly normal state. The accuracy of misfire detection is lowered, therefore. To be specific, the frequency at which the presence of a misfire is determined in step S18 described above is reduced relative to the frequency at which a misfire actually occurs.

In this embodiment, the misfire determination part 15 changes the misfire condition, so that a misfire determination result can more precisely reflect the frequency of misfires that actually occurred.

Figure 7:
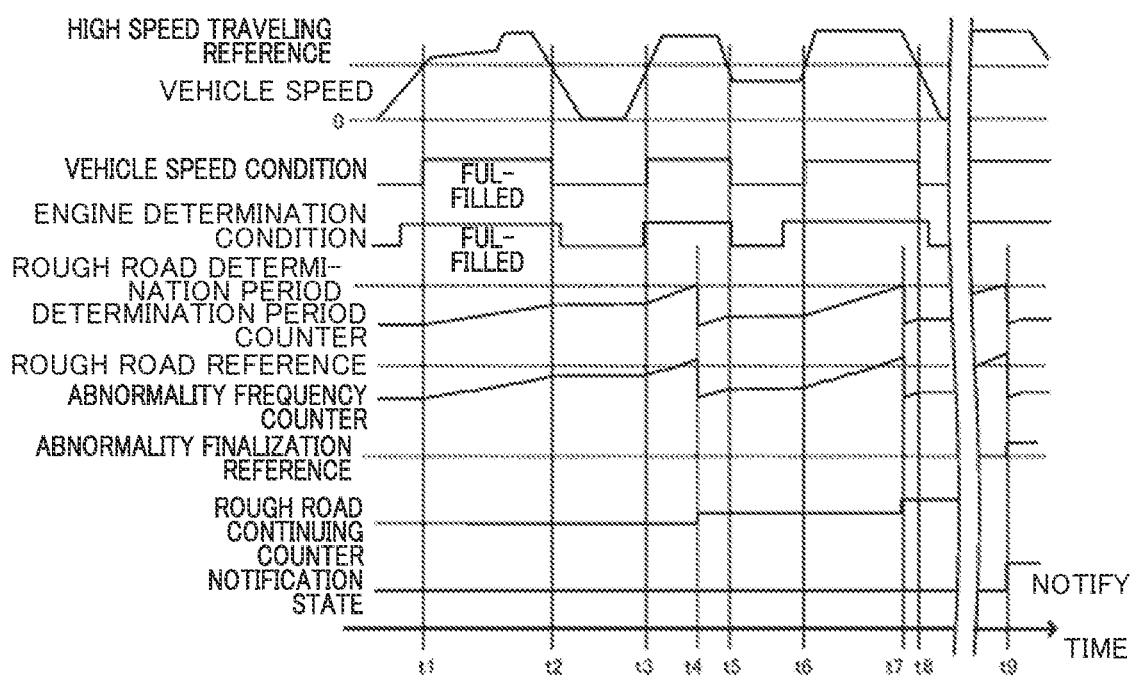
FIG. 7 A time chart illustrating exemplary operations of the drive train abnormality determination device FIG. 8 A block diagram showing a drive train abnormality determination device according to a second embodiment of the present teaching

FIG. 7 is a time chart illustrating exemplary operations of the drive train abnormality determination device.

FIG. 7 shows the vehicle speed of the straddled vehicle 50, a vehicle speed condition flag, an engine determination condition flag, a determination period counter, the abnormality frequency counter, the rough road continuing counter, and a notification state flag.

In the exemplary operations shown in FIG. 7, the straddled vehicle 50 repeats acceleration, deceleration, and stopping. The vehicle speed of the straddled vehicle 50 increases and decreases.

The engine determination condition also changes in accordance with a traveling state of the straddled vehicle 50.

The determination period is counted when the straddled vehicle 50 travels at a vehicle speed higher than the high speed traveling reference and additionally the engine operates in the high load and high rotation region (Yes in S12 of FIG. 6). More specifically, the determination period is a period from time t1 to time t2, a period from time t3 to time t5, a period from time t6 to time t8, and a period to time t9.

The rough road determination (S15) is performed if the vehicle speed condition is fulfilled and additionally the engine determination condition is fulfilled (Yes in S12 of FIG. 6). That is, the rough road determination (S15) is performed in the period from time t1 to time t2, in the period from time t3 to time t5, in the period from time t6 to time t8, and in the period to time t9. If the vehicle speed condition is not fulfilled or if the engine determination condition is not fulfilled, the rough road determination is not performed. In such a case, the value of the determination period is kept unchanged.

If the vehicle speed condition is fulfilled and additionally the engine determination condition is fulfilled, it is determined that the rotation speed fluctuation physical quantity $\Delta$OMG is within the rough road determination region AR, and the abnormality frequency counter is counted.

At times t4, t7, and t9, the determination period reaches the value of the rough road determination period. Times t4, t7, and t9 are timings for the rough road determination. At each of these times, the abnormality frequency counter is more than a drive train abnormality reference, and therefore the rough road continuing counter is counted. The rough road continuing counter is counted up.

At time t9, the rough road continuing counter exceeds the abnormality finalization reference, so that the abnormality of the drive train is finalized, to enter a notified state in which deterioration of the drive train is notified. That is, the notification signal transmission part 16 transmits a notification signal for providing a notification to the notification device 30 (S31).

The drive train abnormality determination device 10 according to this embodiment determines the presence of a rough road by using a distribution state based on rotation speed fluctuation physical quantities $\Delta$OMG. Based on whether or not the presence of a rough road has been continuously determined, whether this determination is actually due to traveling on rough road or is due to an abnormality of the drive train is further determined. Accordingly, an abnormality of the drive train can be determined with a simple configuration by using a result of the rough road determination.

Figure 8:
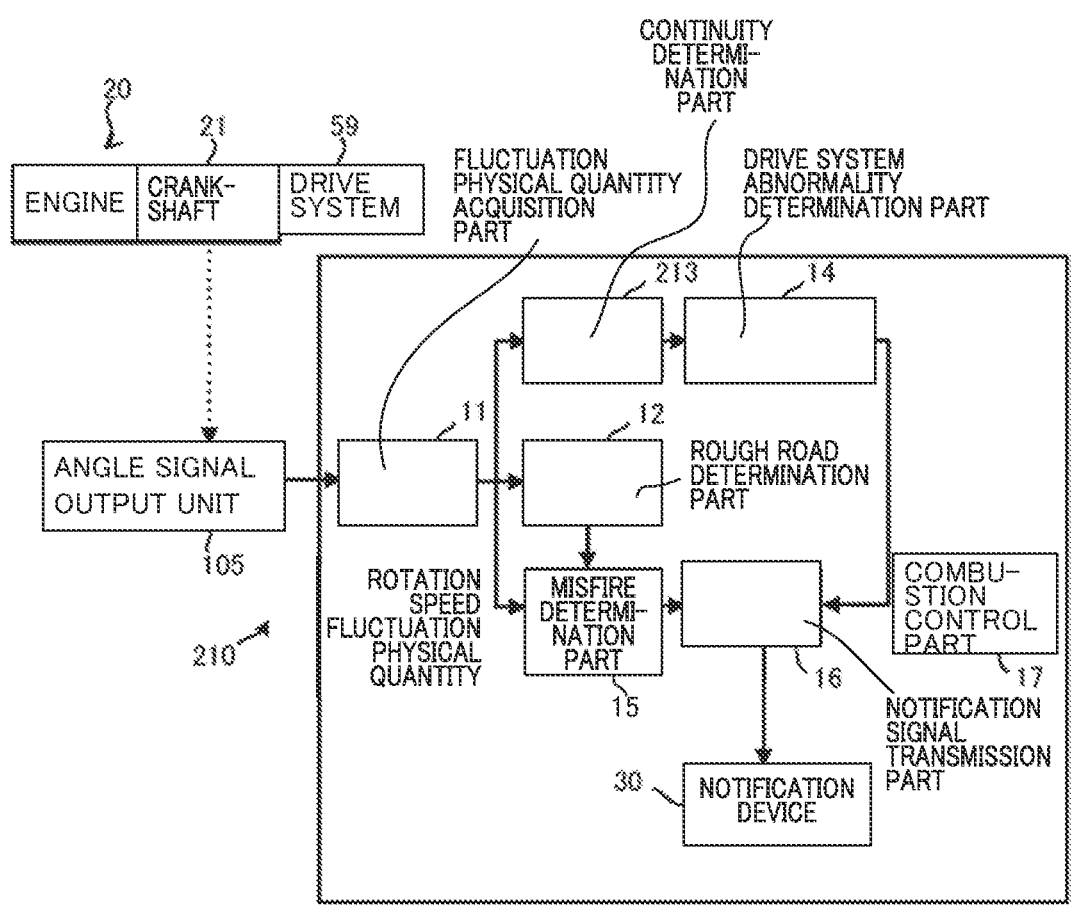

FIG. 8 is a block diagram showing a drive train abnormality determination device according to a second embodiment of the present teaching.

A drive train abnormality determination device 210 according to this embodiment includes a continuity determination part 213 that performs a determination process for determining whether or not a state is continuing where the rough road condition is satisfied, the determination process being performed separately from the determination process performed by the rough road determination part 12. Thus, the continuity determination part 213 according to this embodiment performs both the process performed by the continuity determination part 13 of the first embodiment and the process performed by the rough road determination part 12 of the first embodiment. In this embodiment, however, satisfaction of the rough road condition is notified based on a result of the determination not by the continuity determination part 213 but by the rough road determination part 12. If the continuity determination part 13 determines that the state is continuing where the rough road condition is satisfied, the drive train abnormality determination part 14 determines that the drive train 59 has an abnormality.

The other configurations and operations in this embodiment are identical to those in the first embodiment, and therefore are given the same reference signs as those of the first embodiment, without descriptions of them.

REFERENCE SIGNS LIST 10 drive train abnormality determination device (misfire detection device)
11 fluctuation physical quantity acquisition part (fluctuation physical quantity acquisition unit)
12 rough road determination part (rough road determination unit)
13 continuity determination part (continuity determination unit)

14 drive train abnormality determination part (drive train abnormality determination unit)
15 misfire determination part (misfire determination unit)
16 notification signal transmission part (notification signal transmitter)
20 engine
21 crankshaft (rotator)
50 vehicle
59 drive train
59a wrapping transmission element
59b transmission wheel
105 angle signal output unit

The invention claimed is:

1. A drive train abnormality determination device mountable to a straddled vehicle, the straddled vehicle including an engine and a drivetrain, the drivetrain including a rotator, a clutch, a transmission device, and a driving force transmit device, the drive train abnormality determination device comprising:
 a processor; and
 a non-transitory storage medium having program instructions stored thereon, execution of the program instructions by the processor causing the drive train abnormality determination device to provide functions of:
 an angle signal output unit that periodically outputs an angle signal in accordance with rotation of the rotator;
 a rotator rotation speed fluctuation physical quantity acquisition unit that acquires a rotator rotation speed fluctuation physical quantity related to a fluctuation in a rotation speed of the rotator, based on the angle signal from the angle signal output unit;
 a rough road determination unit that determines whether or not a distribution state or pattern, based on the acquired rotator rotation speed fluctuation physical quantity, satisfies a predetermined rough road condition;
 a continuity determination unit that determines whether or not the rough road condition is continuously satisfied; and
 a drivetrain abnormality determination unit that determines, responsive to a determination by the continuity determination unit that the rough road condition is continuously satisfied, that the drive train has an abnormality in its functioning, in accordance with a difference in continuity, with respect to satisfaction of the rough road condition, between traveling on a rough road and having abnormal functioning of the drive train.

2. The drive train abnormality determination device according to claim 1, wherein
 the continuity determination unit determines whether or not the rough road condition is continuously satisfied, upon detecting that the straddled vehicle is traveling at a speed higher than a set upper limit speed at which the straddled vehicle is able to travel on a rough road.

3. The drive train abnormality determination device according to claim 1, the execution of the program instructions by the processor further causes the drive train abnormality determination device to provide functions of:
 a misfire determination unit that determines whether or not the distribution state or pattern, based on the acquired rotator rotation speed fluctuation physical quantity, satisfies a predetermined misfire condition, wherein
 responsive to determination by the drive train abnormality determination unit that the drive train has the abnormality in its functioning, the misfire determination unit changes the predetermined misfire condition.

4. The drive train abnormality determination device according to claim 3, the execution of the program instructions by the processor further causes the drive train abnormality determination device to provide functions of:
 a notification signal transmitter that transmits a notification signal to a notification device, responsive to the determination by the drive train abnormality determination unit that the drive train has the abnormality in its functioning, the notification signal causing the notification device to provide a notification that the drive train does have the abnormality in its functioning.

5. A straddled vehicle, comprising:
 an engine;
 a drive train including a rotator, a clutch, a transmission device, and a driving force transmit device; and
 the drive train abnormality determination device according to any one of claims 1 to 4, for determining the abnormality in functioning of the drive train.

* * * * *